United States Patent Office 3,301,851
Patented Jan. 31, 1967

3,301,851
AMINOPIPERAZINE DERIVATIVES
John W. Cusic, Skokie, and Ernest F. Le Von, Morton Grove, Ill., assignors to G. D. Searle & Co., Chicago, Ill., a corporation of Delaware
No Drawing. Filed Oct. 21, 1965, Ser. No. 500,360
6 Claims. (Cl. 260—240)

The present invention relates to a group of derivatives of 1-aminopiperazine wherein the 4-position of the piperazine is unsubstituted or has a lower alkanoyl group as a substituent. More particularly, the present invention relates to a group of compounds having the following formula

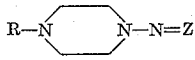

wherein R is selected from the group consisting of hydrogen and lower alkanoyl; and Z is selected from the group consisting of pyridylmethylene and

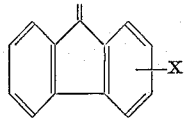

wherein X is selected from the group consisting of hydrogen, halogen, and methoxy. The lower alkanoyl groups referred to above contain up to 6 carbon atoms and can be exemplified by acetyl, propionyl, and butyryl. The halogens referred to above include fluorine, chlorine, bromine, and iodine.

Also encompassed by the present invention are salts of the above compounds. Thus, the compounds indicated above form non-toxic salts with a variety of inorganic and strong organic acids. That is, they form salts with sulfuric, phosphoric, hydrochloric, hydrobromic, sulfamic, citric, lactic, maleic, malic, succinic, tartaric, cinnamic, acetic, benzoic, gluconic, and related acids.

The compounds of this invention are useful because of their pharmacological properties. In particular, these compounds are anti-ulcer agents in that they inhibit ulceration in the Shay rat. They are also pepsin inhibitors, anti-inflammatory agents, and antibiotic agents. The latter activity is demonstrated by their activity against a variety of organism. Thus, they inhibit the growth of algae such as Chlorella vulgaris and protozoa such as Tetrahymena gelleii, and they inhibit germination of seeds of Trifolium.

The compounds of the present invention are conveniently prepared by the reaction of a 1-amino-piperazine with the appropriate aldehyde or ketone. The reaction is ordinarily carried out in an inert solvent such as ethanol at room temperature in the presence, optionally, of an acid catalyst such as acetic acid.

The 1-aminopiperazine to be used as the starting material can be the pure compound or, where it is convenient, it can be in the form of the aqueous acetic acid solution obtained from the reduction of 1-nitrosopiperazine with zince and acetic acid.

Those compounds in which R is acyl can be obtained from the appropriate aminopiperazine as indicated above or they can be obtained by acylation of a mono-substituted piperazine with the appropriate lower alkanoyl halide or acid anhydride.

The following examples are presented to further illustrate the present invention; they should not be construed as limiting it in spirit or in scope. In these examples, quantities are indicated in parts by weight unles parts by volume are specified and temperatures are indicated in degrees centigrade (° C.). The relationship between parts by weight and parts by volume is the same as that existing between grams and milliliters.

Example 1

15 parts of zinc is suspended in 500 parts by volume of 50% aqueous acetic acid and the mixture is cooled to 0–5° C. To this mixture is added, portionwise at a 0–5° C., a solution of 15.0 parts of 1-nitrosopiperazine in 30 parts of water. The mixture is stirred for 30 minutes and then filtered through infusorial earth. A solution of 15 parts of fluorenone in 160 parts of ethanol is added to the filtrate with some cooling. The mixture is then allowed to warm to room temperature and stand at that temperature for about 28 hours. It is then extracted with 2 portions of benzene to remove unreacted fluorenone.

The remaining aqueous solution is then cooled, 270 parts of benzene is added, and the mixture is made alkaline by the addition of 415 parts of concentrated ammonium hydroxide. The benzene layer is then separated and the remaining aqueous solution is extracted wtih 180 parts of benzene. The two benzene solutions are combined, washed with water, and dried over potassium carbonate. The solvent is evaporated; the residual orange syrup is dissolved in hexane and the solution is seeded. The precipitate which forms is then filtered, washed with some hexane, and vacuum dried to give 1-(9-fluorenylideneamino)piperazine melting at about 73–77° C. This compound has the following formula

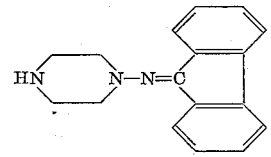

Example 2

To a solution of 5.0 parts of 1-(9-fluorenylideneamino)piperazine in 20 parts of pyridine there is added 4 parts of acetic anhydride while the mixture is cooled in a water bath. The mixture is then allowed to stand for about 30 minutes at room temperature before it is diluted with benzene and washed with excess aqueous potassium carbonate and then with water. The benzene solution is dried over potassium carbonate and the solvent is evaporated to leave a residual orange syrup. This is dissolved in 50% benzene in hexane and chromatographed on a silica column. The column is then eluted with higher concentrations of benzene in hexane until pure benzene is used and it is then eluted with increasing quantities of ethyl acetate in benzene. The fractions eluted with 50% ethyl acetate in benzene are combined and the solvent evaporated. The residual solid is recrystallized from ethyl acetate containing some hexane to give a yellow-orange solid. This product is 1-acetyl-4-(9-fluorenylideneamino)piperazine and it melts at about 135–136° C.

Example 3

A solution of 2.5 parts of 2-fluoro-9-fluorenone and 32 parts of ethanol is added portionwise to a stirred solution of 4.0 parts of 1-aminopiperazine in 170 parts by volume of 50% aqueous acetic acid. A precipitate forms but redissolves after an additional 2 hours of stirring. The mixture is then allowed to stand at room temperature for 65 hours before it is poured into a mixture of 250 parts of ice and 190 parts of concentrated ammonium hydroxide. The mixture is extracted with benzene and the benzene extracts are combined, washed with water until neutral, and dried over potassium carbonate. The solvent is then evaporated and the residue is digested with a mixture of hexane and ethyl acetate. The liquid is then decanted and the residue is dissolved in ethyl acetate and mixed with an ethyl acetate solution of 1.0 part of oxalic acid. The solid which forms is separated by filtration, washed, and dried to give the oxalate salt of 1-(2-fluoro-9-fluorenylideneamino)piperazine melting at about 213–215° C.

*Example 4*

A solution of 2.5 parts of 3-bromo-9-fluorenone in 60 parts of ethanol and 20 parts of acetic acid is added to 170 parts by volume of a 50% aqueous acetic acid solution containing 4.3 parts of 1-aminopiperazine. The mixture is allowed to stand at room temperature for about 65 hours before it is filtered to remove insoluble material. The clear yellow filtrate is then poured into a mixture of 180 parts of concentrated ammonium hydroxide and ice. The resultant mixture is extracted with benzene and the combined benzene extracts are washed with water and dried over potassium carbonate. Evaporation of the solvent under reduced pressure gives an orange syrup. This is dissolved in about 15 parts of ethyl acetate and a solution of 1.0 part of oxalic acid in about 15 parts of ethyl acetate is added slowly. A precipitate forms. This is separated by filtration, washed throughly with ethyl acetate, and dried under reduced pressure. The product thus obtained is the oxalate salt of 1-(3-bromo-9-fluorenylideneamino)piperazine melting at about 199–202° C. with decomposition.

*Example 5*

A solution of 2.5 parts of 2-iodo-9-fluorenone in 20 parts of tetrahydrofuran is added slowly to a stirred solution of 4.0 parts of 1-aminopiperazine in 170 parts by volume of 50% aqueous acetic acid. The resultant mixture is stirred at room temperature for 65 hours and then filtered to remove the precipitate that forms. The filtrate is then poured into a mixture of 250 parts of ice and 180 parts of concentrated ammonium hydroxide. The resultant mixture is extracted with benzene and the benzene extracts are combined and washed with water until neutral. The benzene solution is dried over potassium carbonate and then evaporated to dryness. The residue is digested with ether and filtered to remove a small amount of insoluble material. The solvent is then evaporated and the residue is dissolved in 25 parts of ethyl acetate and a solution of 0.8 part of oxalic acid in 15 parts of ethanol is added slowly. A precipitate forms and is separated by filtration, washed well with ethyl acetate and dried under vacuum. It is then suspended in about 75 parts of benzene and the suspension is stirred vigorously with a solution of 10 parts of potassium carbonate in 75 parts of water. The benzene layer is then separated, washed with water, and dried over potassium carbonate. Evaporation of the solvent leaves a gummy orange syrup which crystallizes on the addition of ethyl acetate. The suspension is then filtered, washed with ethyl acetate and with hexane and finally dried to give 1-(2-iodo-9-fluorenylideneamino)-piperazine melting at about 144–147° C.

*Example 6*

A solution of 2.5 parts of 2-methoxy-9-fluorenone in 35 parts of ethanol is added to a solution of 4.3 parts of 1-aminopiperazine in 170 parts by volume of 50% aqueous acetic acid. The mixture is allowed to stand for 65 hours before it is extracted with benzene. The remaining aqueous acid solution is then poured into a mixture of 180 parts of concentrated ammonium hydroxide and ice. The resultant mixture is extracted with benzene and the benzene solution is washed with water and dried over potassium carbonate. The solvent is then evaporated to leave a dark red orange syrup. This is dissolved in about 15 parts of hot ethyl acetate and the solution is decanted from a small amount of solid. The ethyl acetate solution is then slowly concentrated to about 10 parts by volume. A yellow-orange crystalline precipitate appears in the solution. This is separated by filtration and washed with 50% ethyl acetate-hexane and dried. The product thus obtained is 1-(2-methoxy-9-fluorenylideneamino)piperazine and it melts at about 137–143° C.

*Example 7*

A solution is prepared from 2.2 parts of 1-aminopiperazine and 3.2 parts of pyridine-4-carboxaldehyde in 20 parts of ethanol and it is allowed to stand at room temperature for about 16 hours. At the end of this time no material has precipitated from solution so a solution of 2.3 parts or maleic acid in about 15 parts of ethanol is added. Shortly thereafter, a crystalline precipitate starts to form. After about 2 hours, the mixture is filtered to collect the precipitate which is washed with ethanol and dried under reduced pressure. The product thus obtained melts at about 160° C. with decomposition. It is the dimaleate salt of 1-(4-pyridylmethyleneamino)piperazine. The free base of this compound has the following formula

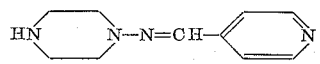

What is claimed is:
1. A compound of the formula

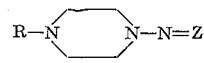

wherein R is selected from the group consisting of hydrogen and lower alkanoyl; and Z is selected from the group consisting of pyridylmethylene and

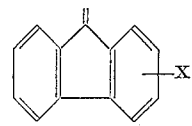

wherein X is selected from the group consisting of hydrogen, halogen, and methoxy.

2. 1-(4-pyridylmethyleneamino)piperazine.
3. A compound of the formula

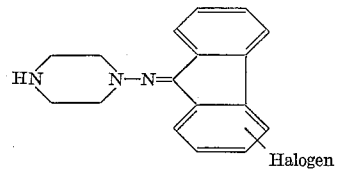

4. 1-(2-fluoro-9-fluorenylideneamino)piperazine.
5. 1-(3-bromo-9-fluorenylideneamino)piperazine.
6. 1-(9-fluorenylideneamino)piperazine.

No references cited.

ALEX MAZEL, *Primary Examiner.*

HENRY JILES, *Examiner.*